MICROWAVE FREQUENCY DISCRIMINATOR

Filed Sept. 21, 1955

INVENTOR
C. L. RUTHROFF
BY Roy M. Porter, Jr.
ATTORNEY

United States Patent Office 2,883,533
Patented Apr. 21, 1959

2,883,533

MICROWAVE FREQUENCY DISCRIMINATOR

Clyde L. Ruthroff, Fair Haven, N.J., assignor to Bell Telephone Laboratories, Incorporated, New York, N.Y., a corporation of New York Application September 21, 1955, Serial No. 535,599

12 Claims. (Cl. 250—27)

This invention relates to circuits which are responsive to frequency variation and more particularly to a frequency discriminator adapted for use in the microwave range.

Wave transmission systems often require a device which will develop across its output terminals a voltage the magnitude of which is substantially proportional to the deviation from the nominal or reference frequency of the input signal and the sign of which depends upon whether the frequency is higher or lower than the reference. Such a device, called a frequency discriminator, finds application, for example, as a component in a circuit for oscillator frequency stabilization. In general the discriminator output voltage has been obtained by directing two unidirectional voltages derived respectively from two detectors in series opposition to each other. It is characteristic of detectors that their operating characteristics vary with ambient temperature. However, the nature of this variation depends on the individual detector used; no two detectors vary with temperature in precisely the same manner. As a consequence, with a temperature variation from the normal operating point, the non-similar variations of the two detectors results in an incorrect discriminator voltage output. As a consequence, the reliability of the frequency comparison is very poor.

It is an object of the invention therefore to produce a discriminator output signal that is independent of variations in ambient temperature.

It is a more specific object of the invention to produce frequency discriminator response that is independent of temperature dependent operating characteristics of component devices.

Frequency stabilization of oscillators whose outputs are frequency modulated has presented a particularly difficult problem in the past. Discriminators employing two balanced detectors have been used in this situation for providing frequency stabilizing control signals. However, this arrangement is so fast acting that the oscillator's response to the rapid variations in the control signal results itself in an additional but spurious frequency modulation of the oscillator output. This spurious frequency modulation either destroys or distorts the normal intelligence-bearing frequency modulation applied to the oscillator.

It is an additional object of the invention, therefore, to provide frequency stabilization of a frequency modulated oscillator without disturbing the normal intelligence-bearing frequency modulation.

In accordance with the invention, a frequency discriminator is provided that employs a single detector. The use of the single detector, as compared with the two required by prior art, renders the discriminator relatively independent of ambient temperature variation. It has been recognized that the output of the single detector during a first period of time may be stored or delayed for comparison with the output from the same detector during an immediately successive period of time. By directing these outputs in series opposition to each other a resultant discriminator output voltage is obtained indicative of the magnitude and sense of the frequency deviation from the reference.

The magnitude of the unidirectional voltage output of a detector is proportional to the microwave energy exciting it. The energy exciting it comprises one component reflected from a resonant cavity resonant at the reference frequency and another component reflected from the short-circuited termination of a branch wave guide. During a first period, the electrical path length of the short-circuited wave guide branch is of a given length. During the next succeeding period this electrical path length is increased by a phase difference of 90 degrees; the total round trip path length thereby being increased by 180 degrees. The output of the detector during this first period is compared with the output of the detector during the second period. This comparison describes the frequency of wave energy relative to the reference frequency.

A particularly useful feature of the present invention resides in the utilization of such a discriminator for frequency stabilization of a frequency modulated oscillator. A continuous sample of the oscillator output is applied to the discriminator and the resulting output from the discriminator is in turn employed to control the oscillator. By making the above-mentioned first and second periods of relatively long duration with respect to the period of the oscillator frequency output, any spurious frequency modulation initiated by the control signals occurs at long intervals relative to the period of the oscillator frequency. In general radio repeater stations are insensitive to such slow variations and thus the true frequency modulated signal is transmitted undistorted. Although the above-mentioned first and second periods of the discriminator are long with respect to the period of the oscillator frequency, they are short with respect to the period of expected oscillator frequency drift, i.e., the variation in average oscillator frequency (which may be considered analogous to a carrier frequency). As a consequence the oscillator frequency is efficiently stabilized and at the same time the information content of the intelligence-bearing frequency modulation remains undisturbed.

These and other objects and features of the present invention, the nature of the invention and its advantages will appear more fully upon consideration of the various specific illustrative embodiments shown in the accompanying drawings and in the following detailed description. In the drawings.

Figures 1, 2:
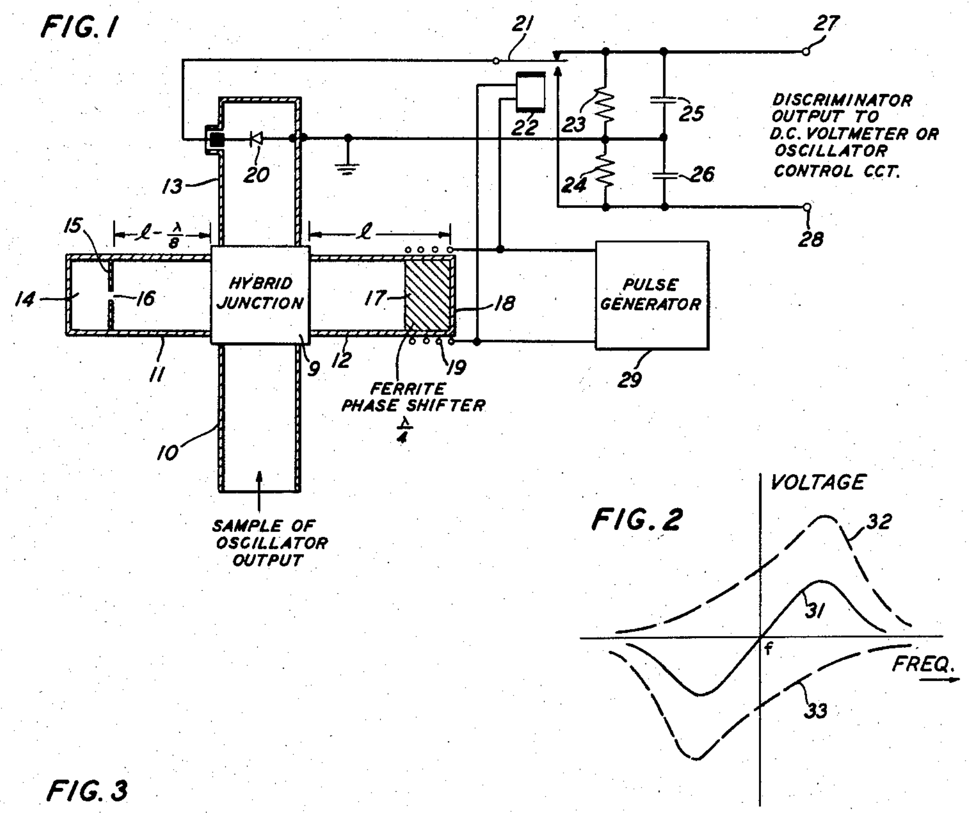
Fig. 1 is a diagrammatic representation of the frequency discriminator in accordance with the invention.
Fig. 2 is a graphical representation given for the purpose of explanation of the output characteristic of the discriminator of Fig. 1.

More particularly the discriminator shown in Fig. 1, by way of example for purposes of illustration, comprises two major divisions with a device for synchronizing them. The first division is a wave guide arrangement, designed to excite the detector. It comprises a matched hybrid junction with a resonant cavity in a first branch wave guide, a phase changer in the second and a detector in the third. The second major division is a lumped parameter electric circuit comprising two meshes with a delay device in each of them. It is this circuit that stores and compares immediately successive outputs from the detector. The lengths of the successive periods are determined by the device synchronizing the two major divisions.

Considering more specifically now the abovementioned wave guide portion of the discriminator, a hollow input wave guide 10 of rectangular cross section is coupled to a matched hybrid 9. The input guide and hybrid 9 are proportioned to support only the dominant mode, $TE_{10}$, vertically polarized. A first branch 11 of hybrid 9, perpendicular to input guide 10 and coupled thereto at the junction of the hybrid, is terminated at its end by a resonant cavity 14 proportioned to resonate at the reference frequency $f$. Cavity resonator 14 is electromagnetically coupled to first branch 11 at the septum 15 through an aperture 16. For maximum discrimination the resonator should match the guide in impedance at the frequency $f$. In a second branch 12 of hybrid 9, opposite to the first, is located a block of ferrite material 17 filling the end section of branch 12. Branch 12 is otherwise terminated by a short-circuiting metal plate 18. Circumscribing the guide in the region of ferrite block 17 is a solenoid 19 disposed so as to subject ferrite block 17 to a longitudinal magnetic field when desired. The distance from short-circuited reflecting plate 18 to the junction of the hybrid may be an arbitrary distance $l$. The distance of septum 15 of the cavity resonator 14 to the junction of the hybrid is a distance $l$ minus ⅛ wavelength of the reference signal in the guide having frequency $f$. Waves traveling to and reflected from cavity resonator 14 in branch 11 therefore will experience a phase difference of $\lambda/4$, or 90 degrees, relative to waves traveling to and reflected from short-circuited termination 18 of branch 12. Ferrite 14 in branch 12 is of the type such that when a magnetic field is applied to it by solenoid 19 it introduces a phase delay to the propagated waves. By applying a field of appropriate strength the phase delay is made equal to $\lambda/4$. As a consequence the round-trip path length of the propagated waves in branch 12 through polarized ferrite 17 is $\lambda/2$ or 180 degrees greater than that experienced by the wave in branch 12 with the ferrite demagnetized. The time during which ferrite 17 is demagnetized may be considered a first period. The second period coincides with the application of a magnetic field to ferrite 17. A third branch 13 of hybrid 9 perpendicular to branches 11 and 12 just described, contains therein at its end a detector 20 that produces a unidirectional voltage proportional to the microwave energy exciting it in wave guide 13. In the embodiment of Fig. 1 a crystal detector is used, however, a semiconductor diode, thermistor or any related rectifying component is suitable. The microwave energy exciting crystal detector 20 comprises a component from the cavity resonator branch 11 and a component from the ferrite phase delay branch 12.

Consider now the lumped parameter circuit. Detector 20 in third branch 13 is electrically coupled to a bridge circuit describing two distinct meshes. A switch 21 actuated by a relay 22 alternately couples the detector to each of the meshes. In one of the two meshes is located a resistor 23 in series opposition to the resistor 24 of the other mesh and a capacitor 25 in series opposition to the capacitor 26 of the other mesh. The output from detector 20 during the above-mentioned first period is coupled to the first mesh with the output being stored in capacitor 25 and a potential drop developing across the resistor 23. During the second period the output from detector 20 is coupled by means of switch 21 and relay 22 to the second mesh whereby it is stored in capacitor 26 and develops a potential drop across resistor 24. At this time the output stored during the first period in capacitor 25 is discharged and passes through the series opposing resistor 23 whereby the potential drop across both resistors may be measured at terminals 27 and 28.

Essentially then, the switching periods described are controlled in the lumped parameter circuit, by relay 22. The periods in the wave guide section are synchronized with those in the lumped parameter circuit by synchronizing relay 22 and solenoid 19 via a pulse generator 29 which actuates both. Thus, with an output from pulse generator 29 a magnetic field is applied via solenoid 19 to ferrite 17 in hybrid branch 12 at the same time that relay 22 is actuated and detector 20 is coupled to the second mesh of the lumped parameter circuit. The interval between pulses is equal to the duration of the pulse, thereby insuring that the abovementioned first and second periods are of equal duration.

Consider now the operation of the embodiment of Fig. 1. When a microwave signal which is a sample from the output of the oscillator (not shown), hereafter called an incident signal, traveling into guide 10 reaches the junction of hybrid 9 it induces in branches 11 and 12, equal signals proportional to the incident signal. When these induced signals respectively reach resonant cavity 14 of branch 11 and short-circuited termination 18 of branch 12, they are reflected and reverse their direction of propagation traveling back to the junction of the hybrid. Thereupon each of the induced signals divides, one component of each induced signal passing in the reverse direction through the input guide and the other component of each induced signal exciting branch 13 and thereby exciting detector 20 contained therein.

The portion of the incident signal which excites branch guide 11 is reflected at septum 15 of the cavity resonator. The phase of this reflected portion depends upon the deviation of the incident signal from the reference frequency $f$. At the same time, the portion of the incident signal induced in branch 12 is reflected back by short-circuited termination 18 without any action by ferrite 17 since the ferrite is demagnetized. As a consequence with the incident signal at the reference frequency $f$, a 90-degree phase difference exists between the waves reaching the hybrid junction from branches 11 and 12. Therefore the wave components exciting detector 20 in third branch 13 are in quadrature. Detector 20 generates a unidirectional potential in the lumped parameter circuit which is stored in capacitor 25 and is proportional to the wave in branch 13 whose components are in quadrature.

With the generation of a pulse from pulse generator 29, solenoid 19 applies a magnetic field to ferrite block 17 whereby a phase delay of 90 degrees is introduced in branch 12 of the hybrid. This marks the beginnning of the second period. With the introduction of the phase delay the total path length of the energy propagated and reflected in branch 12 is increased by180 degrees. As a consequence the components from branches 11 and 12 exciting detector 20 in branch 13 are still in quadrature and therefore the resultant is of the same magnitude as that which existed during the first period. Note, however, that the generation of the pulse from pulse generator 29 simultaneously actuates relay 22. Thus detector 20 is coupled to the second mesh of the lumped parameter circuit which is in series opposition to the first mesh. The unidirectional voltage generated during the second period across resistor 24 in the second mesh is in series opposition to the unidirectional potential of the first period stored in capacitor 25 of the first mesh and which now, being discharged from capacitor 25, develops a potential drop across resistor 23 of the first mesh. As a consequence the potential across both resistors measured across terminals 27 and 28 is zero. The indication thereby being that the incident signal is of the same frequency as the reference signal.

The reactive component of the impedance of resonator 14 as viewed at aperture 16 passes through zero at the frequency $f$ and has a negative slope on each side thereof. Therefore this component increases with the frequency deviation and is capacitive above $f$ and inductive below $f$. This reactance in turn causes a phase shift in the signal reflected from resonant cavity 14 in branch 11 which increases with the frequency deviation and is leading below $f$ and lagging above $f$. When this phase shift is lagging, the angle between the two signal components in detector branch 13 of the hybrid becomes acute and the vector sum is increased. However, during the second period when the reflected signal in branch 12 is delayed 180 degrees the angle between the signal components in detector branch 13 becomes obtuse and the vector sum is decreased. As a result detector 20 is more strongly excited during the first period than during the second and because of the series opposing meshes coupled to detector 20 a net positive potential is obtained between output terminals 27 and 28. This positive potential increases in magnitude as the frequency of the incident signal increases from *f*.

On the other hand, at frequencies of the incident signal below *f* the leading phase shift produces an obtuse angle between the signal components in detector branch 13 during the first period and an acute angle between the signal components during the second period. As a result detector 20 is more strongly excited during the second period than during the first and there appears at output terminals 27 and 28 a net negative potential which increases as the signal frequency decreases from *f*.

Fig. 2 shows a typical discrimination characteristic of the discriminator of Fig. 1. The middle curve 31 represents the resultant of the two potentials developed during the first and second periods. With a change in ambient temperature each one of the components 32 and 33 will be shifted due to variation in the detector characteristic. However, since the same detector is used during both periods the change of each component will be of the same magnitude as the other and in the opposite direction, i.e., the two component curves 32 and 33 are always symmetric about the origin defined by the frequency axis and the voltage axis intersecting it at *f*. As a consequence, the cross-over point of resultant curve 31 will remain fixed although the amplitudes to the right and left may vary somewhat. It may be seen, therefore, that regardless of the variation in ambient temperature, an incident signal at the reference frequency *f*, and at no other, will always result in a zero potential across the output terminals of the discriminator.

The ferrite phase changer in branch 12 of the embodiment of Fig. 1 was presented by way of example. Various types of ferrite devices will introduce a phase delay to electromagnetic waves propagated therethrough. If desired, therefore, the magnetic field applied to ferrite 17 need not be longitudinal but may be transverse. With a transverse field applied the ferrite need not fill the guide but may be a slab disposed along either of the short dimensions of the branch guide. The amount of phase delay may be controlled in this arrangement by mechanically changing the position of the slab along the direction transverse to the longitudinal axis of the branch guide 12.

It may be seen that the duration of the above-discussed first and second periods is determined by the length of the pulses developed by pulse generator 29. When the discriminator in accordance with the invention is employed for the stabilization of a frequency modulated oscillator, the duration of these periods, as discussed above, should be long relative to the period of the oscillator frequency output but short with respect to the expected period of frequency drift or average frequency variation. Pulse generator 29 may accordingly be calibrated to produce pulses of appropriate length. When it is the case that the duration of the first and second periods should be greater than that which can be conveniently provided by a pulse generator a mechanical arrangement, now to be described, may advantageously be employed with the discriminator.

Figure 3:
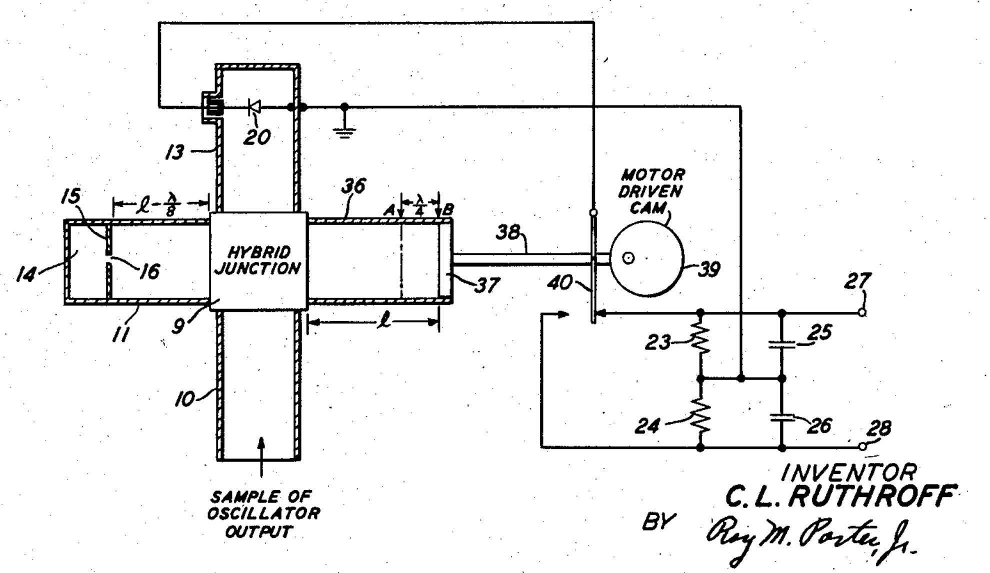
Fig. 3 is a variation of the embodiment of Fig. 1, employing mechanical phase delay and switching means.

Referring now to Fig. 3, a variation in accordance with the embodiment of the discriminator of Fig. 1 is represented in which elements of Fig. 3 corresponding to elements of Fig. 1 are designated by the same numerals as in Fig. 1. In this embodiment a mechanical means is utilized for switching from one mesh to another during alternate periods and similarly a mechanical means is utilized for introducing a $\lambda/4$ phase delay in the phase changer branch of the hybrid junction. In branch 36 of the hybrid of Fig. 3 which is longer by $\lambda/4$ than branch 12 in Fig. 1, a movable piston 37 terminates the branch. The face of piston 37 is metallic and provides a short-circuited termination. With the piston located at point A, a distance $l$ from the junction, the operation of the arm is similar to that in Fig. 1 with ferrite 17 unpolarized, that is, the reflected wave from piston 37 lags that of the reflected wave from the cavity resonator by 90 degrees. With the piston located at point B, a distance of $l$ plus $\lambda/4$ from the junction, the reflected wave from branch 36 lags the reflected wave from the cavity resonator by 270 degrees; this situation being similar to that of Fig. 1 with the magnetic field applied to ferrite 17. Attached to the end 38 of the piston is a cam 39 driven by a motor (not shown) to cyclically move piston 37 between A and B, a distance of $\lambda/4$. Coupled to cam 38 is a single-pole, double-throw, mechanical switch 40 for alternately directing the output of the detector from the first to the second mesh of the lumped parameter circuit. The switching of the lumped parameter circuit and the increase of electrical path length in branch 36 of the hybrid being thereby synchronized.

In the discussion of the embodiments of Figs. 1 and 3, the advantage of the temperature compensation afforded by the invention was explained. Another factor may enter into faulty discriminator response due to ambient temperature variation. The resonant frequency of the resonant cavity may vary with temperature. As a result the discriminator response curve 31 of Fig. 2 would shift, whereby the cross-over point would be at some frequency other than *f*. This effect may readily be rectified by replacing either (but not both) of the resistors 23 or 24 of Fig. 1 by a thermistor. Thermistors are temperature sensitive devices and one may be selected whose temperature response compensates for the variation in resonant frequency of the cavity. The effect of replacing one of the resistors by a thermistor may be understood by referring to Fig. 2. If the effect of the change in resonant frequency is to shift the response curve 31 to the right, for example, then of course both the component curves 32 and 33 are likewise shifted. However the effect of the compensating thermistor is to shift the lower component curve 33 to the left by a distance equal to the right shift of the upper curve 32. This results in the cross-over point of resultant curve 31 remaining fixed at *f*.

In all cases it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. A microwave frequency discriminator system comprising a multibranch wave guide hybrid junction having a first input branch of said hybrid junction for receiving microwave signals applied thereto, a resonant cavity coupled to a second branch, a third branch having a short-circuited metallic plate termination, means for varying the electrical path length of said third branch by a discrete amount equal to an odd integral number of quarter wavelengths of the carrier frequency of said system, a single detecting means located in a fourth branch for detecting microwave power present in said fourth branch, and a lumped parameter electric circuit coupled to said detecting means defining a voltage output proportional to the difference in power present in said fourth branch as said third branch varies in electrical path length.

2. A frequency discriminator comprising a distributed parameter electromagnetic wave transmission means, means for periodically delaying during a first period the phase of one component of said electromagnetic wave in said transmission means substantially 180 degrees with reference to the phase of said component during a second period, a single detector located within one branch of said tranmission means for deriving a unidirectional potential during each of said periods proportional to the microwave power therein, a lumped parameter electric circuit including a switching means in series with said single detector, means coupling said switching means with said phase delay means for simultaneously actuating both of said means, and a passive delay means included in said circuit for sustaining the potential derived during either of said periods into the next succeeding period, said switching means directing said potentials generated during said successive periods in series opposition to each other within said circuit.

3. A combination as recited in claim 2, wherein said single detector comprises a crystal.

4. A combination as recited in claim 2, wherein said periodic phase delay means comprises a ferrite block disposed within a second branch of said transmission means and a solenoid circumscribing said second branch in the region of said ferrite block for applying a magnetic field to said ferrite.

5. A combination as recited in claim 2 wherein said switching means comprises an electromechanical relay.

6. A combination as recited in claim 2 wherein said coupling means comprises a pulse generator, the output of said pulse generator serving as the input of said switching means and said phase delay means.

7. A combination as recited in claim 2 wherein said passive delay means comprises two capacitors disposed in series opposition to each other.

8. A combination as recited in claim 2 wherein said periodic phase delay means comprises a movable metallic piston.

9. A combination as recited in claim 2 wherein said switching means comprises a mechanical single-pole double-throw switch.

10. A combination as recited in claim 2 wherein said coupling means comprises a motor-driven cam mechanically linked to said periodic phase delay means and to said switching means.

11. A frequency discriminator comprising a multibranch electromagnetic wave transmission means, a single detector located within one branch of said transmission means for deriving a unidirectional potential proportional to the microwave power therein, means for periodically varying the phase relationship of the components of said electromagnetic wave excited in said branch, said phase varying means comprising a block of ferrite material located within a second branch of said transmission means and a solenoid circumscribing said branch for applying a magnetic field to said ferrite block, said periodically varying phase relationship defining a resultant wave in said branch exciting said single detector and remaining constant in magnitude throughout all of said periods for said wave having a given frequency $f$, said periodically varying phase relationship defining a resultant wave in said branch exciting said detector and alternating in magnitude between two values through said successive periodic variations for said wave having any frequency different from $f$, and a lumped parameter electric circuit coupled to said single detector and to said phase varying means and including a delay means responsive to the potential induced in said circuit by said single detector, whereby said potential induced in said circuit by said detector during one of said periods is stored in said delay means and is in series opposition to the potential induced during the next succeeding period, said circuit defining a voltage output proportional to the difference in power present in said branch containing said detector during any two immediately successive periods.

12. A frequency discriminator comprising an electromagnetic wave transmission means, means for periodically delaying during a first period the phase of one component of said electromagnetic wave in said transmission means substantially 180 degrees with reference to the phase of said component during a second period, said periodic phase delay means comprising a ferrite block disposed within a second branch of said transmission means and a solenoid circumscribing said second branch in the region of said ferrite block for applying a magnetic field to said ferrite, a single detector located within one branch of said transmission means for deriving a unidirectional potential during both said periods proportional to the microwave power therein, a lumped parameter electric circuit including a switching means in series with said single detector, means coupling said switching means with said phase delay means for simultaneously actuating both of said means, and a passive delay means included in said circuit for sustaining the potential derived during either of said periods into the next succeeding period, said switching means directing said potentials generated during said successive periods in series opposition to each other within said circuit.

References Cited in the file of this patent

UNITED STATES PATENTS 2,564,005 Halpern et al. ---------- Aug. 14, 1951
2,805,334 Cayzac ---------------- Sept. 3, 1957